United States Patent
Neto et al.

(10) Patent No.: US 7,555,163 B2
(45) Date of Patent: Jun. 30, 2009

(54) SYSTEMS AND METHODS FOR REPRESENTING SIGNED DISTANCE FUNCTIONS

(75) Inventors: Murilo Gondim Coutinho Neto, Los Angeles, CA (US); Sebastian Mark Marino, West Hollywood, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 828 days.

(21) Appl. No.: 11/015,245

(22) Filed: Dec. 16, 2004

(65) Prior Publication Data

US 2006/0133691 A1    Jun. 22, 2006

(51) Int. Cl.
*G06K 9/46* (2006.01)

(52) U.S. Cl. .................. 382/204; 345/421; 345/441; 345/582; 345/619; 345/653; 356/601; 382/106; 382/154; 382/199

(58) Field of Classification Search .................. 345/419, 345/424, 619, 653, 421, 441, 582; 356/12, 356/601; 382/154, 204, 254, 276, 106, 199; 703/1, 2, 6
See application file for complete search history.

(56) References Cited

U.S. PATENT DOCUMENTS

| | | | |
|---|---|---|---|
| 4,855,934 A * | 8/1989 | Robinson | 345/582 |
| 5,446,836 A * | 8/1995 | Lentz et al. | 345/441 |
| 6,262,738 B1 * | 7/2001 | Gibson et al. | 345/419 |
| 6,455,835 B1 | 9/2002 | Bernardini et al. | |
| 6,542,249 B1 * | 4/2003 | Kofman et al. | 356/601 |
| 6,628,280 B2 | 9/2003 | Perry et al. | |
| 6,670,962 B2 | 12/2003 | Perry et al. | |
| 6,724,393 B2 | 4/2004 | Perry et al. | |
| 6,968,299 B1 * | 11/2005 | Bernardini et al. | 703/2 |
| 6,990,228 B1 * | 1/2006 | Wiles et al. | 382/154 |
| 7,023,432 B2 * | 4/2006 | Fletcher et al. | 345/419 |
| 7,113,617 B2 * | 9/2006 | Kimmel et al. | 382/106 |
| 7,187,390 B2 * | 3/2007 | Usami et al. | 345/620 |
| 7,257,249 B2 * | 8/2007 | Farsaie | 382/154 |
| 7,272,264 B2 * | 9/2007 | ElShishiny et al. | 382/254 |
| 2002/0097912 A1 * | 7/2002 | Kimmel et al. | 382/199 |
| 2003/0001836 A1 * | 1/2003 | Ernst et al. | 345/419 |
| 2003/0067461 A1 * | 4/2003 | Fletcher et al. | 345/420 |
| 2004/0174361 A1 * | 9/2004 | Yomdin et al. | 345/441 |
| 2004/0179739 A1 * | 9/2004 | Wilinski et al. | 382/232 |
| 2005/0052452 A1 * | 3/2005 | Baumberg | 345/419 |
| 2006/0077203 A1 * | 4/2006 | Neto et al. | 345/419 |
| 2006/0133691 A1 * | 6/2006 | Neto et al. | 382/276 |

* cited by examiner

*Primary Examiner*—Gregory M Desire
(74) *Attorney, Agent, or Firm*—Crowell & Moring LLP

(57) ABSTRACT

A system and method for implicitly computing signed distance values in a graphics application. In one embodiment, rather than storing numerous distance values along a given raster scan line, only two values are stored for each interval defining the intersection of the raster scan line with the shape. These two values represent the interior of the object to be rendered along a given grid line. In another embodiment each grid line may be parameterized (e.g., from 0 to 1). Each intersection interval may then be represented by the parameter value at an entry point of the surface and an exit point of the surface, along the given grid line.

30 Claims, 11 Drawing Sheets

SYSTEMS AND METHODS FOR REPRESENTING SIGNED DISTANCE FUNCTIONS

FIELD OF THE INVENTION

This invention relates generally to describing the boundaries of surfaces in computer graphics applications, and in particular to a more efficient form of implicit representation of computer graphics.

BACKGROUND OF THE INVENTION

The digital representation of surfaces has been an intense area of research for both the computer graphics and applied mathematics communities for the past decade. The idea of using functions to represent shapes is desirable since it allows the development of highly efficient algorithms for modeling and rendering such shapes. Storage of values needed for image rendering has also been a concern given that heretofore it has been necessary to store large amounts of data as part of the process of representing such shapes. Such storage requirements lead to the usage of large amounts of memory.

For example, Boolean operations in constructive solid modeling can be applied to the functions representing the surfaces as opposed to the surfaces themselves, making it straightforward to generate unions, intersections, and subtractions from MRI data, morphing, collision detection, and interface tracking such as in a fluid simulation.

Recall that a function is a mathematical rule for corresponding one set of numerical values to another set. When plotted, or otherwise rendered visually, a function can describe a particular shape. For example, the function $y=x^2$ has the shape of a parabola when plotted on x- and y-axes. A function is a general term which applies to the whole entity which makes values in one set to correspond to other values in another set. The formula, or equation, which goes with a function (e.g., $y=x^2$) is itself called the rule. Functions also are used to map points in space to numerical values, such as is done by an implicit surface function. A signed distance function, denoted by $\Phi$, is a special case of an implicit surface function. Signed distance functions are used to relate a given point in space to the point's distance from the closest point on the interface (not an arbitrary value as may be the case of a generic implicit function representation). Points inside the shape are taken to have negative distance values from the interface, points on the interface have zero distance from the interface, and points outside the shape are taken to have positive distance values from the interface.

If we create a 3D grid around an object, for each point on the grid, we can compute such point's distance to the object's interface. Thus, the 3D grid can be used to approximate the object's shape; grid cells with some corners that evaluate inside and others outside will certainly contain points on the interface. Techniques such as trilinear interpolation are used to compute such points up to an error tolerance. The above described 3D grid representation can be viewed as an explicit representation of a signed distance function. In other words, memory must be allocated for the entire 3D grid, and signed distance values stored for each grid point.

The need to allocate memory for the signed distance functions for each grid point tends to impose constraints on the maximum grid resolution. For instance, a 3D grid resolution of 100 cells along each axis would require 100×100×100×8 bytes=8 MB RAM, (i.e., 8 MB=8 million bytes of Random Access Memory (RAM)), assuming double precision, which is the standard precision used in computing for these types of values. If we increase the resolution to 1000 cells along each axis, we will need 8 GB of memory, which is hardly practical even using the most powerful computer systems nowadays. Note that the higher the resolution, the better the approximation, resulting in a tradeoff between memory usage and the accuracy required by the application at hand.

Therefore, there is a need for an improved system and method for representing signed distance functions in a computer graphics environment.

SUMMARY OF THE INVENTION

Systems and methods for determining a signed distance value of a point is disclosed. In one embodiment, a method includes storing intersection intervals for each of a plurality of grid lines, wherein the grid lines include a plurality of grid cells which make up a grid that contains a shape. The method further includes identifying a grid cell selected from the plurality of grid cells which contains the point, and determining a signed distance value for each of a plurality of corners of the grid cell based on at least some of the stored intersection intervals. In one embodiment, the method further includes determining the signed distance value for the point using the signed distance values for each of the plurality of corners.

Other aspects, features, and techniques of the invention will be apparent to one skilled in the relevant art in view of the following detailed description of the invention.

DETAILED DESCRIPTION OF THE EXEMPLARY EMBODIMENTS

Figure 1:
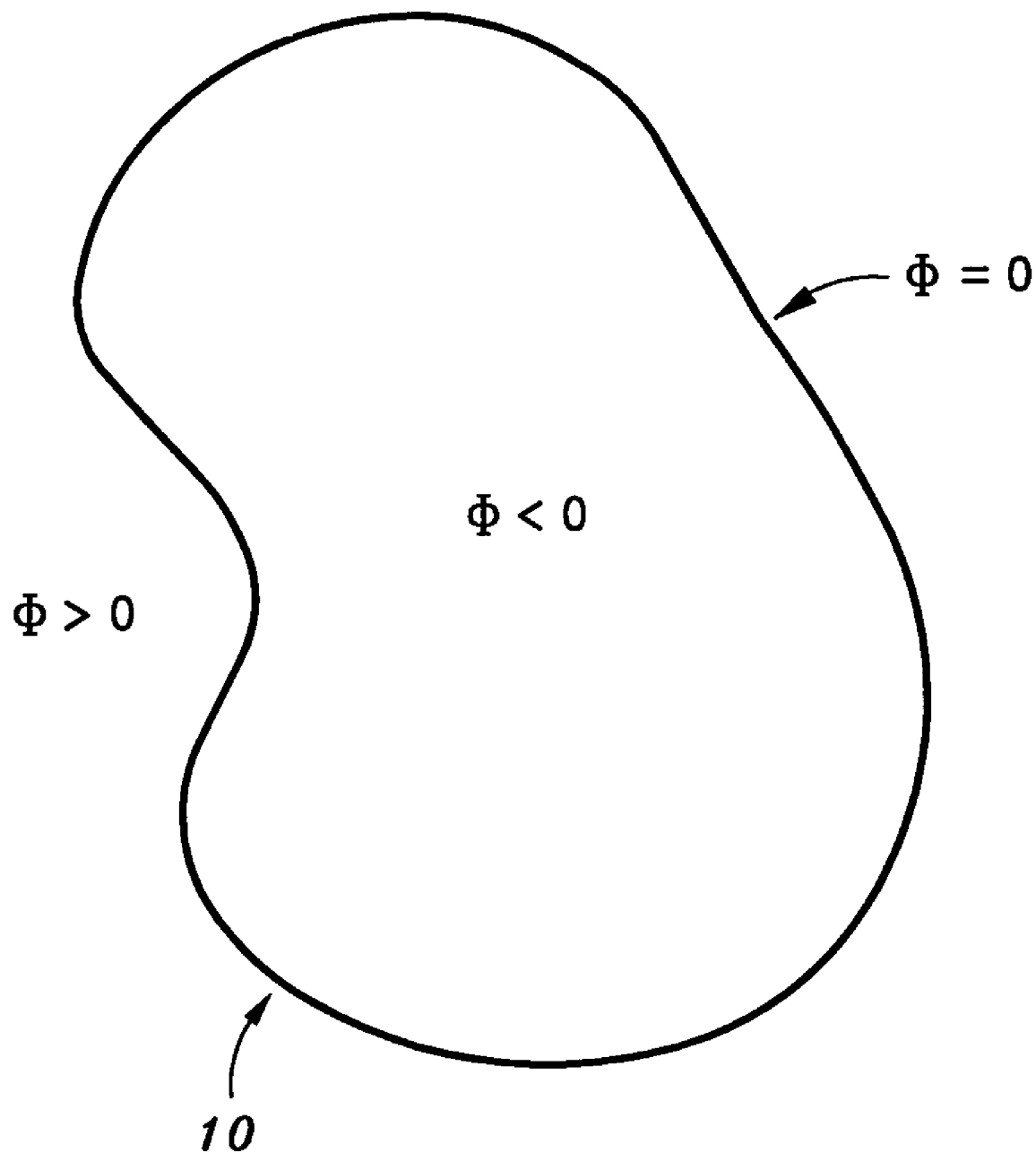
FIG. 1 is a mathematical representation showing an arbitrary shape consistent with the principles of describing said shape with implicit surface functions.

One aspect of the invention is to avoid having to compute and store signed distance values at each grid point along each grid line of a bounded grid containing a surface to be rendered. In one embodiment, this is accomplished by storing only two values for each raster scan line. In another embodiment, the two values represent an intersection interval between a given grid line and the surface to be rendered. Such intervals may be used to represent the interior of the surface along the grid line.

In another embodiment, each grid line may be parameterized (e.g., from 0 to 1). Each intersection interval may then be represented by the parameter value at an entry point of the surface and an exit point of the surface, along the given grid line. Thus, in this embodiment the points themselves are not be stored, but rather only the parameter values for the intersection intervals are stored. In this fashion, intervals may be parametrically defined over a grid line.

Referring now to the figures, there are several different approaches to building an implicit surface function from a given shape, including blobbies, metaballs or radial-based functions. In the case of radial-based functions, the values of the function (e.g., the y-values) decay exponentially as we move toward its center. So, if primitives of different radius are strategically placed close to the interface, their combination (that is, the sum of their implicit functions) can be made to add up to zero at the shape's interface (i.e., zero level set). The actual algorithm used for such placement may be based on optimization techniques that insert and remove spheres depending on the error between the shape being reconstructed from the implicit functions and the actual shape being modeled. However, complex shapes may be very difficult to accurately model using primitives which is why it is sometimes desirable to use signed distance functions.

A signed distance function is a special case of an implicit surface function. Signed distance functions are used to relate a given point in space to the point's distance from the closest point on the interface (not an arbitrary value as may be the case of a generic implicit function representation). Points inside the shape are taken to have negative distance values from the interface, points on the interface have zero distance from the interface, and points outside the shape are taken to have positive distance values from the interface.

If a 3D grid is created around an object, for each point on the grid, such point's distance to the object's interface may be computed. Thus, the 3D grid can be used to approximate the object's shape in which the grid cells have some corners that evaluate inside the object and others outside. Techniques such as trilinear interpolation may be used to compute such points up to an error tolerance. Such a 3D grid representation can be viewed as an explicit representation of a signed distance function. In other words, memory must be allocated for the entire 3D grid, and signed distance values stored for each grid point.

For example, FIG. 1 depicts an approach for graphically rendering surfaces consistent with the principles of the invention. In particular, FIG. 1 shows a surface 10 and the values of the implicit surface function $\Phi(x,y,z)$. The function $\Phi$ is defined to make all points (x,y,z) within the boundary of the surface correspond to negative values, to map all points on the interface of the surface (also known as the zero level set) to zero, and to map all points outside the boundaries of the surface 10 to positive values.

Figure 2:
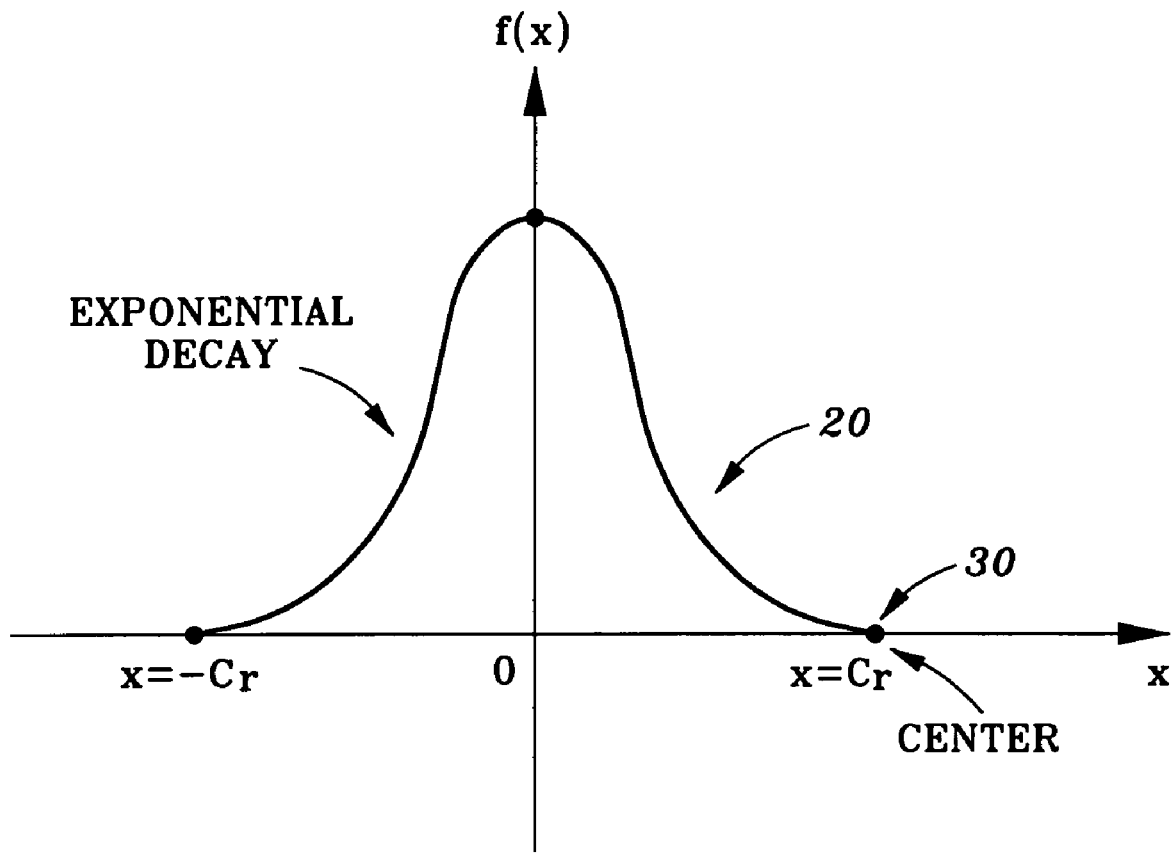
FIG. 2 is a mathematical representation showing the value of a given radial-based function consistent with methods of modeling shapes.

FIG. 2 illustrates one embodiment of a radial-based function which may be used to build an implicit surface function from a given shape. Such a function may be represented with the rule $f(x)=A_r \exp(b_r \|x-C_r\|^2)$, in which the values of the function (i.e. the y-values) decay exponentially as we move toward its center. The $\|x-C_r\|$ denotes the absolute value of the distance of x from the point $x=C_r$. The center point 30 of the function is located at $x=\pm C_r$, as is illustrated in FIG. 2. Each of such primitives affects the value of the implicit surface function to its center 30.

Figure 3:
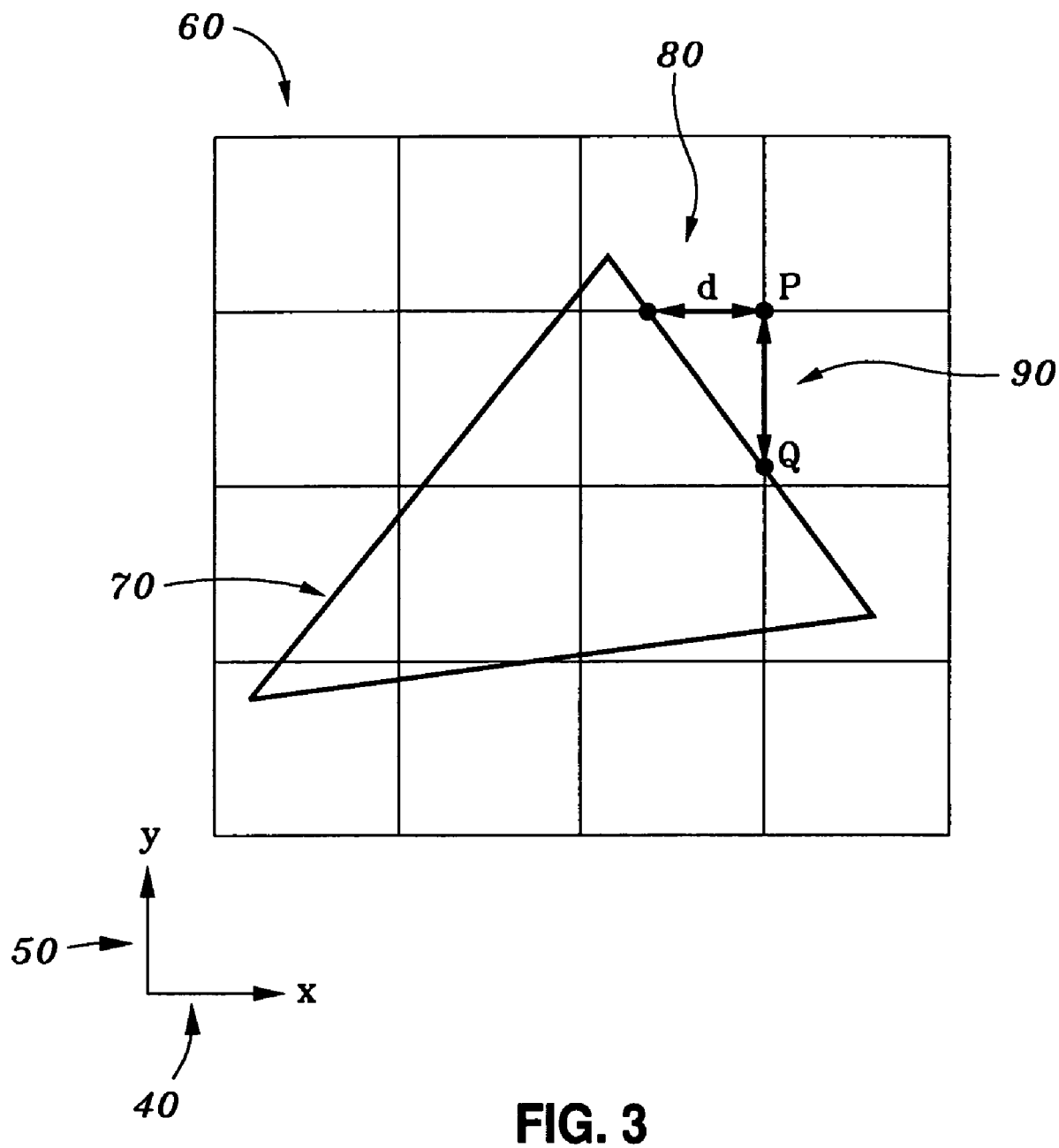
FIG. 3 is one embodiment of a structure diagram describing a grid plane on which a given shape is rendered, consistent with the principles of the present invention.

Referring now to FIG. 3, illustrated is a simplified 2D grid representation of a triangle-shaped 2D object 70 to be graphically rendered. Grid 60 comprises an x-axis, 40 and a y-axis 50. In this embodiment, x-axis 40 and a y-axis 50 may be used to indicate the directions in which grid cell demarcating values increase; i.e. beginning at the lower-corner of the area to be rendered, and then ending at the upper-right corner. By imposing grid 60 on the shape to be rendered 70, the signed distance value for a given point P may be determined by computing the point's vertical distance 90 ('q') and horizontal distance 80 ('d') to the interface of the shape 70. Since d<q in the embodiment of FIG. 3, distance 80 may be used to approximate the signed distance value of point P.

Figure 4A:
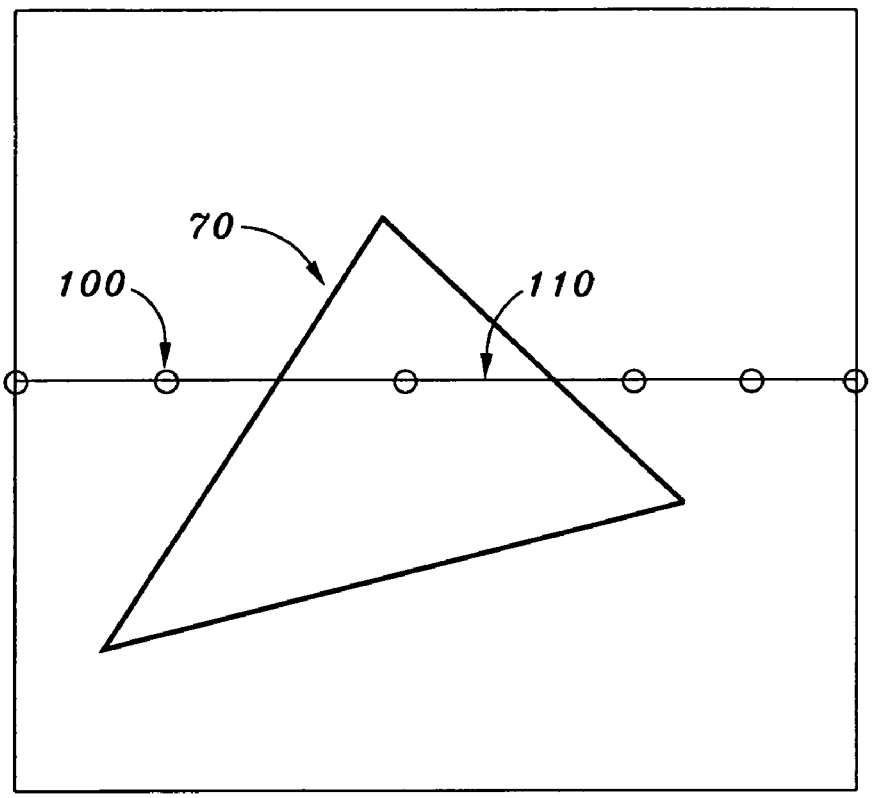
FIGS. 4A-4B are embodiments of a representation describing a raster scan of a shape to be displayed.
Figure 4B:
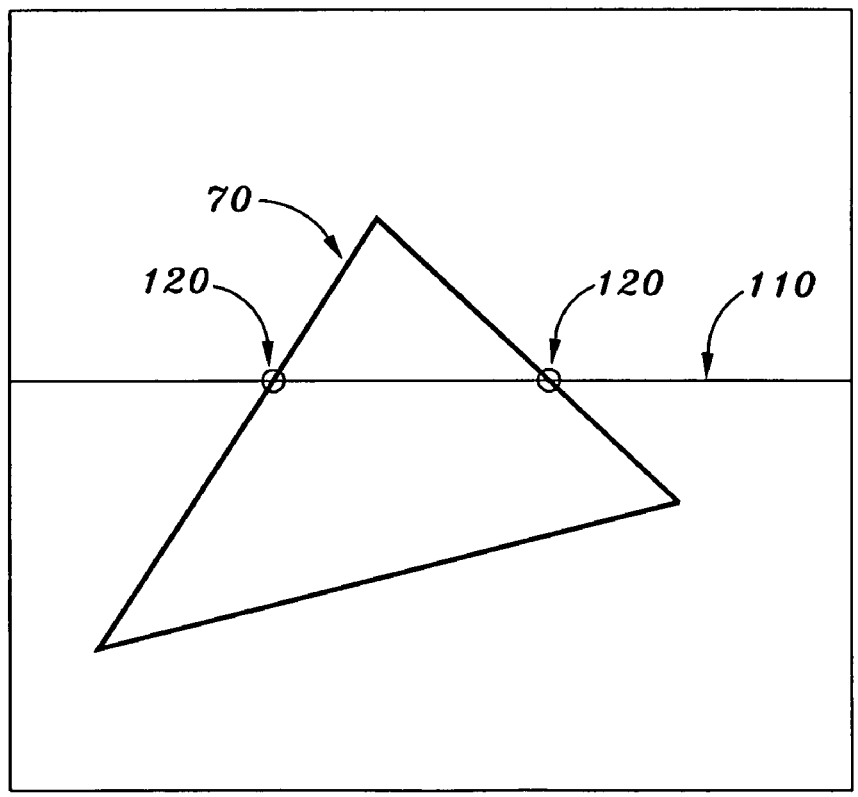

FIG. 4A illustrates a raster scan for shape 70 using explicit representation of signed distance functions where signed distance values are computed and stored at each point 100 along the grid line 110. In contrast, FIG. 4B illustrates how, consistent with the principles of the invention, two values may be used to represent the interior of the surface along a grid line. These two values correspond to the locations of the points 120 of intersection with the edges of shape 70 along grid line 110.

Figure 5:
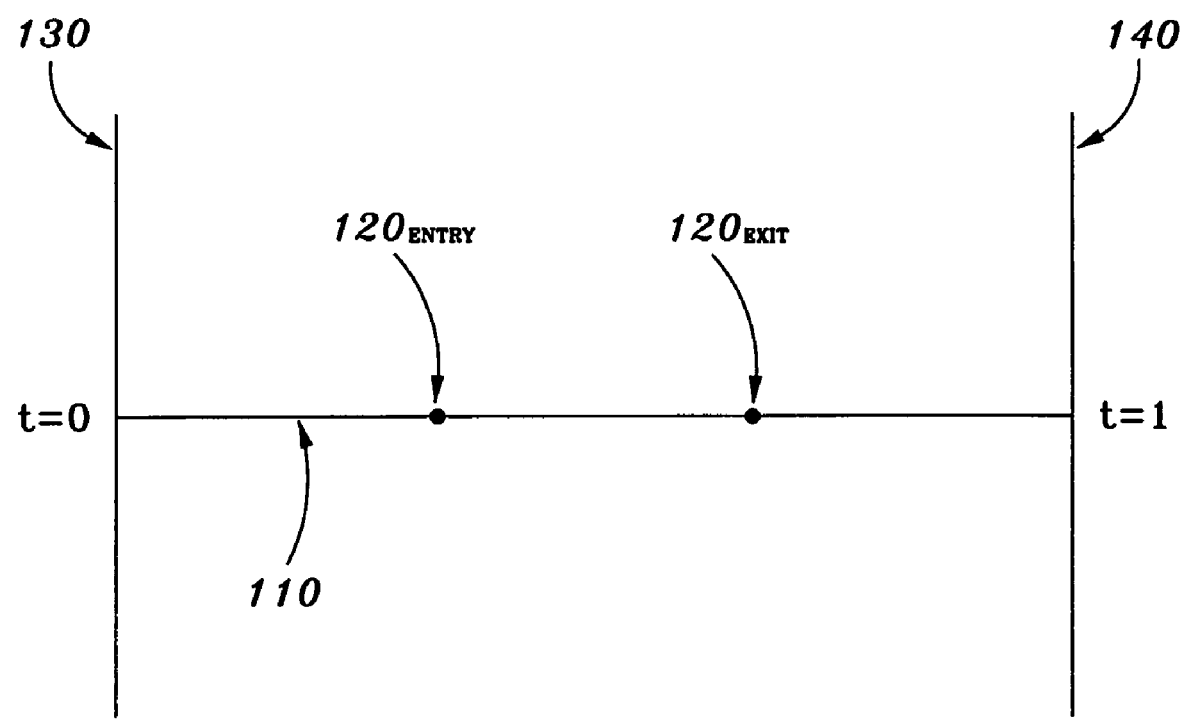
FIG. 5 is one embodiment of a mathematical representation of the parameterization of a grid line, consistent with the principles of the present invention.

Referring now to FIG. 5, depicted is a graphical representation of how intervals are parametrically defined along a given grid line. In this embodiment, grid line 110 is bounded by ends 130 and 140, which may otherwise referred to as the domain walls. Along grid line 110 a parameter (e.g., t) is made to vary between zero (0) and one (1), with t=0 occurring at the left domain wall 130 and t=1 occurring at the right domain wall 140. It should of course be appreciated that the parameter may be made to vary over some other range. The points 120 along grid line 110 which intersect with the shape 70 (not shown) are also shown. In this embodiment, point $120_{Entry}$ corresponds to the point along grid line 110 at which shape 70 is entered as t moves from t=0 to t=1. Similarly, point $120_{Exit}$ corresponds to the point along grid line 110 at which shape 70 is exited as t moves from t=0 to t=1. In one embodiment, rather than storing all values along grid line 110 to represent the surface 70, only the values of t at each of points 120 may be stored.

Figure 6A:
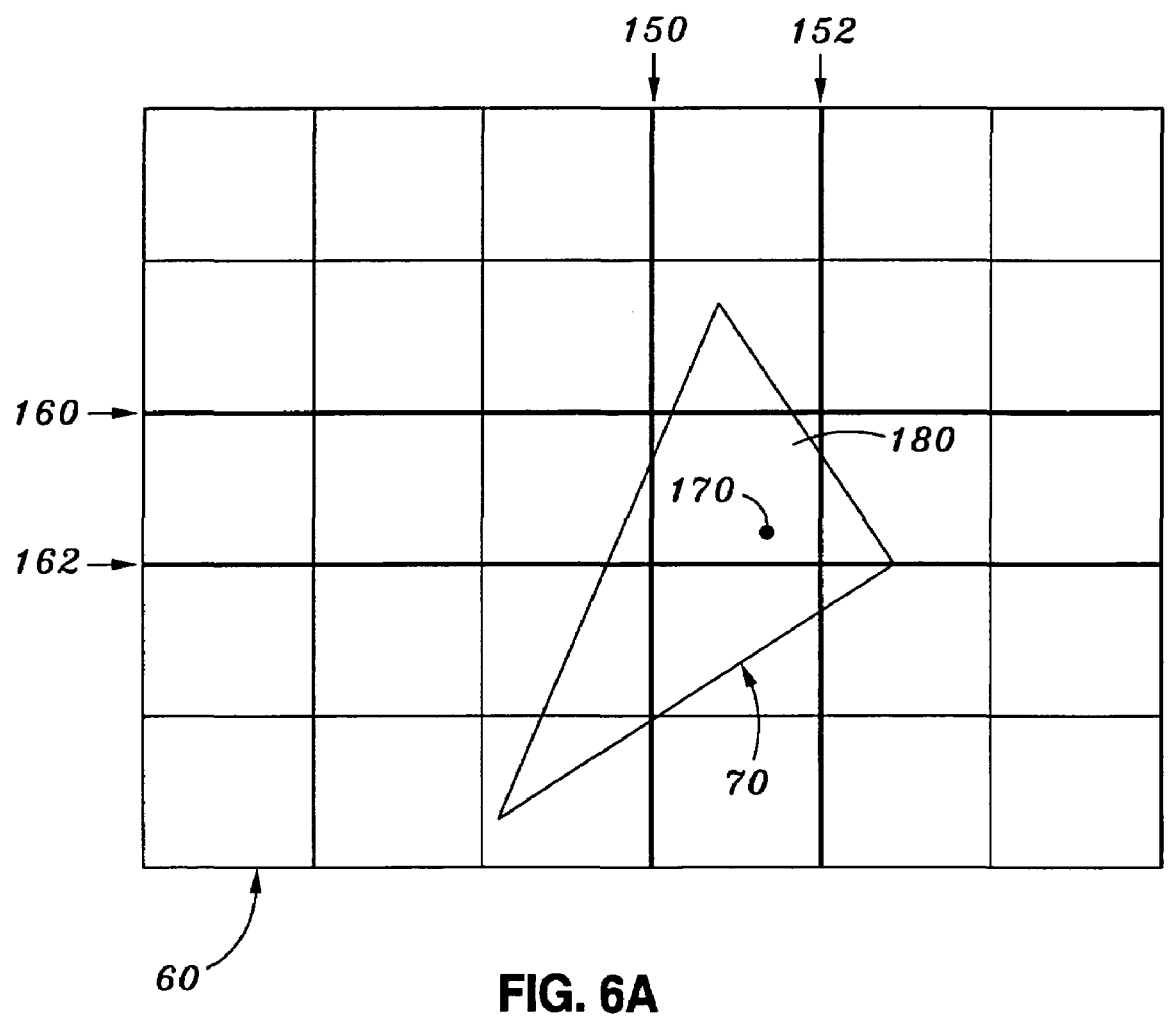
FIG. 6A is one embodiment of a representation of a grid containing a shape to be rendered, consistent with the principles of the present invention.
Figure 6B:
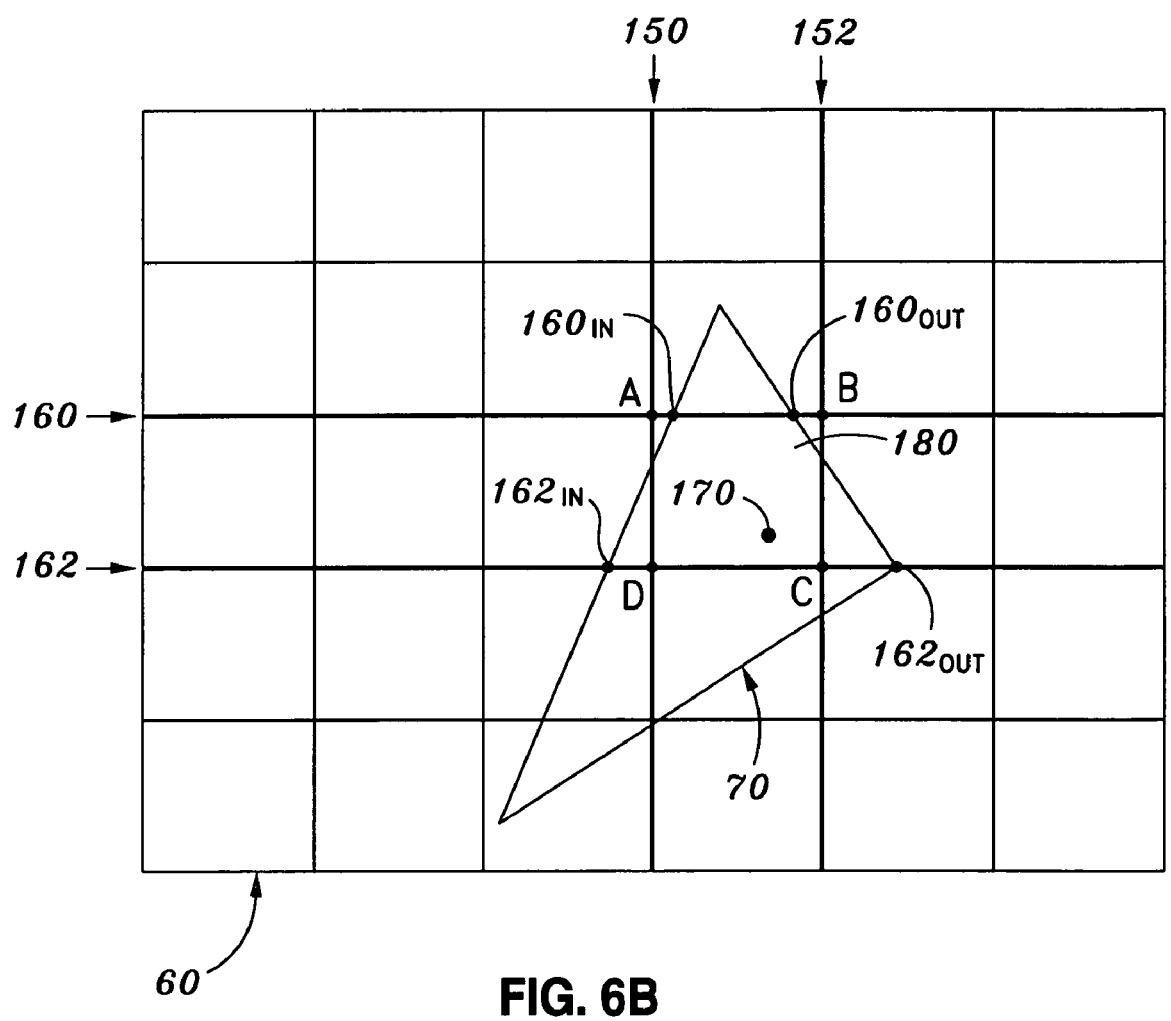
FIG. 6B is one embodiment of a representation of the computation of the signed distance values corresponding to the grid cell containing a point of interest.
Figure 6C:
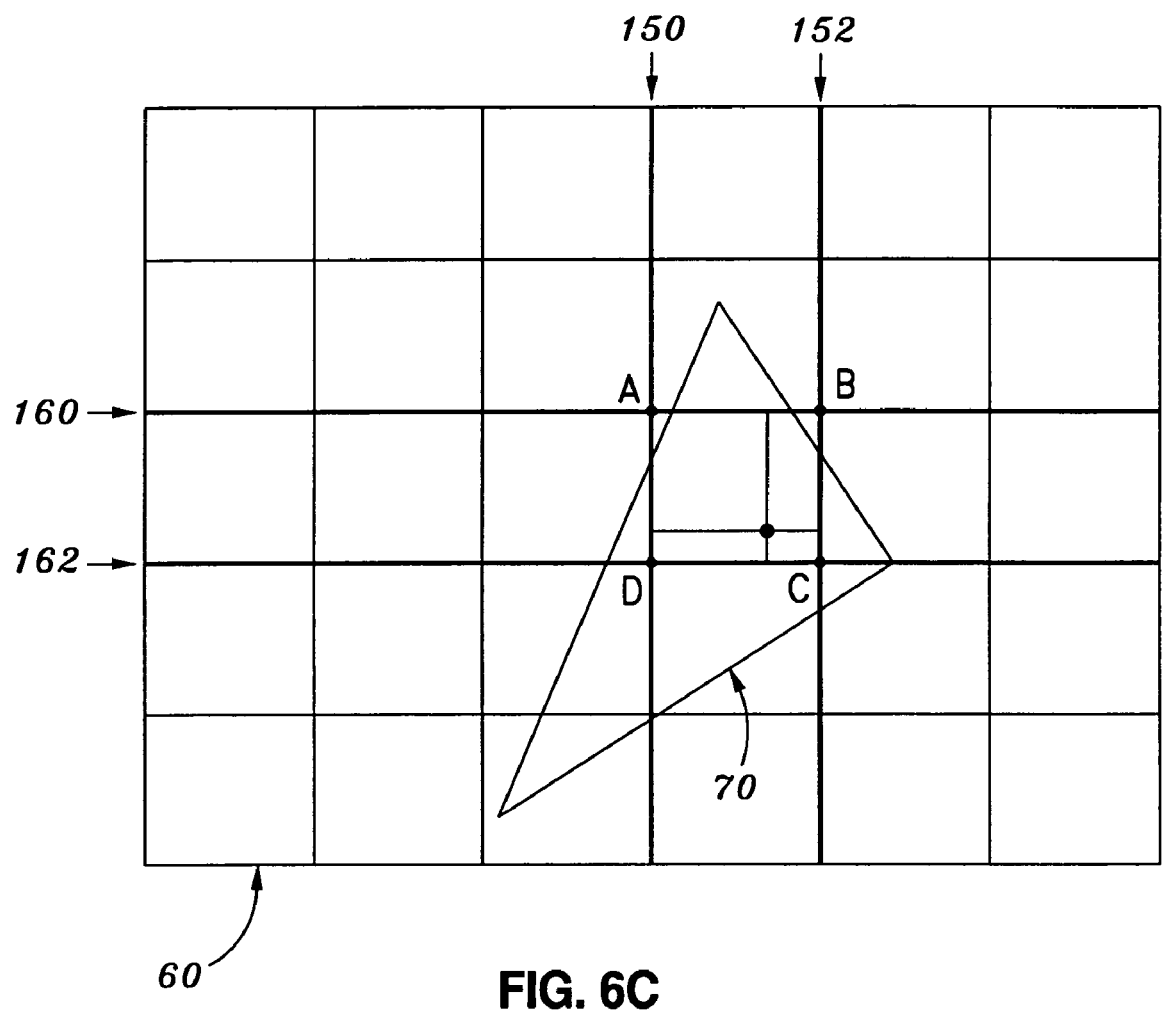
FIG. 6C is a representation of one embodiment of how to determine the signed distance value of a point using the principles of the invention.

FIGS. 6A-6C illustrate how signed distance values may be computed for a given point located within a shape using the principles of the invention. In this embodiment, point 170 is designated as point P and is located within shape 70, which is in turn located in grid 60. FIG. 6A shows the closest grid lines to P as determined by the coordinates of P. In particular, depicted are the two closest vertical lines 150 & 152 and the two closest horizontal lines 160 & 162. In one embodiment, the coordinates of point 170 may be used to determine the closest vertical lines 150 & 152 and closest horizontal lines 160 & 162. Once grid lines 150, 152, 160 and 162 are known, the grid cell 180 containing point 170 will also be known. Moreover, as illustrated by FIG. 6B, once the grid cell 180 containing point 170 is known, it is possible to determine the signed distance values for the points A, B, C and D (therein denoted by 190, 200, 210, and 220) located on the corners of the grid cell 180 that surrounds point 170. As previously mentioned, in one embodiment only the entry and exit points along a given grid line need be stored. In the embodiment of FIG. 6B, these points would be points $160_{IN}$, $160_{OUT}$, $162_{IN}$ and $162_{OUT}$. Thus, rather than storing each point along each grid line, only two points are needed to determine the signed distance value for any point on the grid. Moreover, as previously mentioned, these distance values may be parameterized since the grid is bounded, thereby further decreasing the amount of memory needed to render a given object. By using parameterization, only the parameter (e.g., one value of double precision) for each entry/exit point need be stored.

The values at points 160$_{IN}$, 160$_{OUT}$, 162$_{IN}$ and 162$_{OUT}$ (whether parameterized or not) may be used to determine the signed distance values for points A, B, C and D. For example, the signed distance value for point A would be the distance between 160$_{IN}$ and point A, and in one embodiment would be a parameterized value t (e.g., where $0 \leq 160_{IN} \leq 160_{OUT} \leq 1$). Moreover, since point A is outside the surface 70, this distance function would evaluate to a positive value. In contrast, the signed distance function for point C would evaluate to a negative value since point C is located within surface 70.

As will now be described, once the signed distance values for points A, B, C and D are known, trilinear interpolation may be used to compute the signed distance function for any point within grid cell 180, including point 170. In particular, FIG. 6C is a representation of the trilinear interpolation which may be used to compute the value of the signed distance function at point 170 once the values at the points A, B, C and D are known.

Figure 6D:
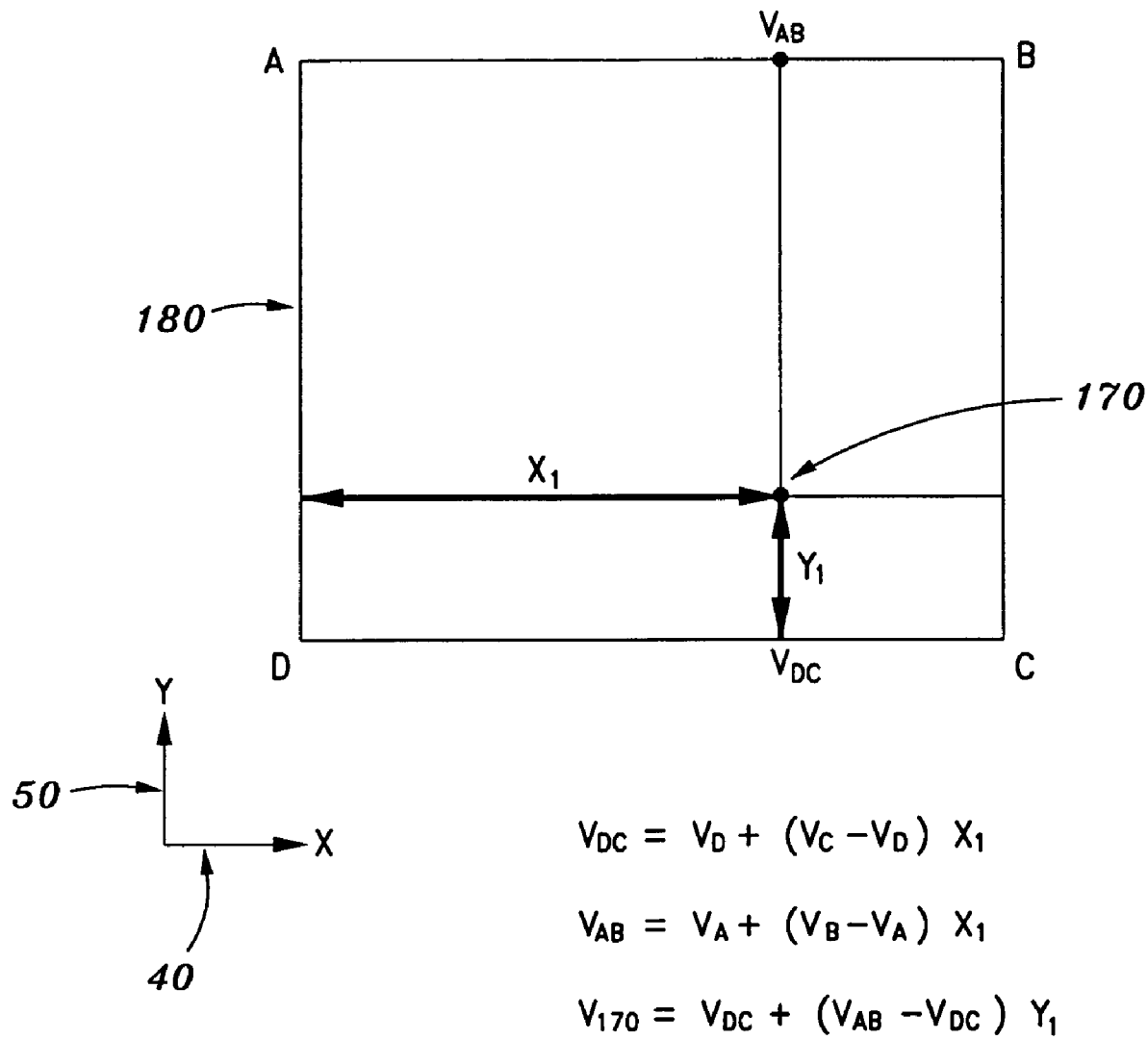
FIG. 6D is a more detailed embodiment of the representation of FIG. 6C.

In one embodiment, the trilinear interpolation technique combines values, two by two, along each coordinate axis to get the final value at the desired point 170. FIG. 6D illustrates this method of trilinear interpolation with more detail. In particular, the position of point 170 inside grid cell 180 is uniquely specified by values (x1, y1) computed from the relative distance to line segments DA and DC aligned with x-axis 40 and y-axis 50, respectively. The trilinear technique starts by combining values along the x-axis 40; that is, combines values at points D and C to get value $V_{DC}$, and values at points A and B to get value $V_{AB}$. The combined values $V_{DC}$ and $V_{AB}$ along the x-axis 40 are used as inputs to combined values along the y-axis 50. In the hypothetical 2D example illustrated in FIG. 6D, the combination of values $V_{DC}$ and $V_{AB}$ along the y-axis 50 already gives the desired value at point 170, which is $V_{170}$.

Figure 7:
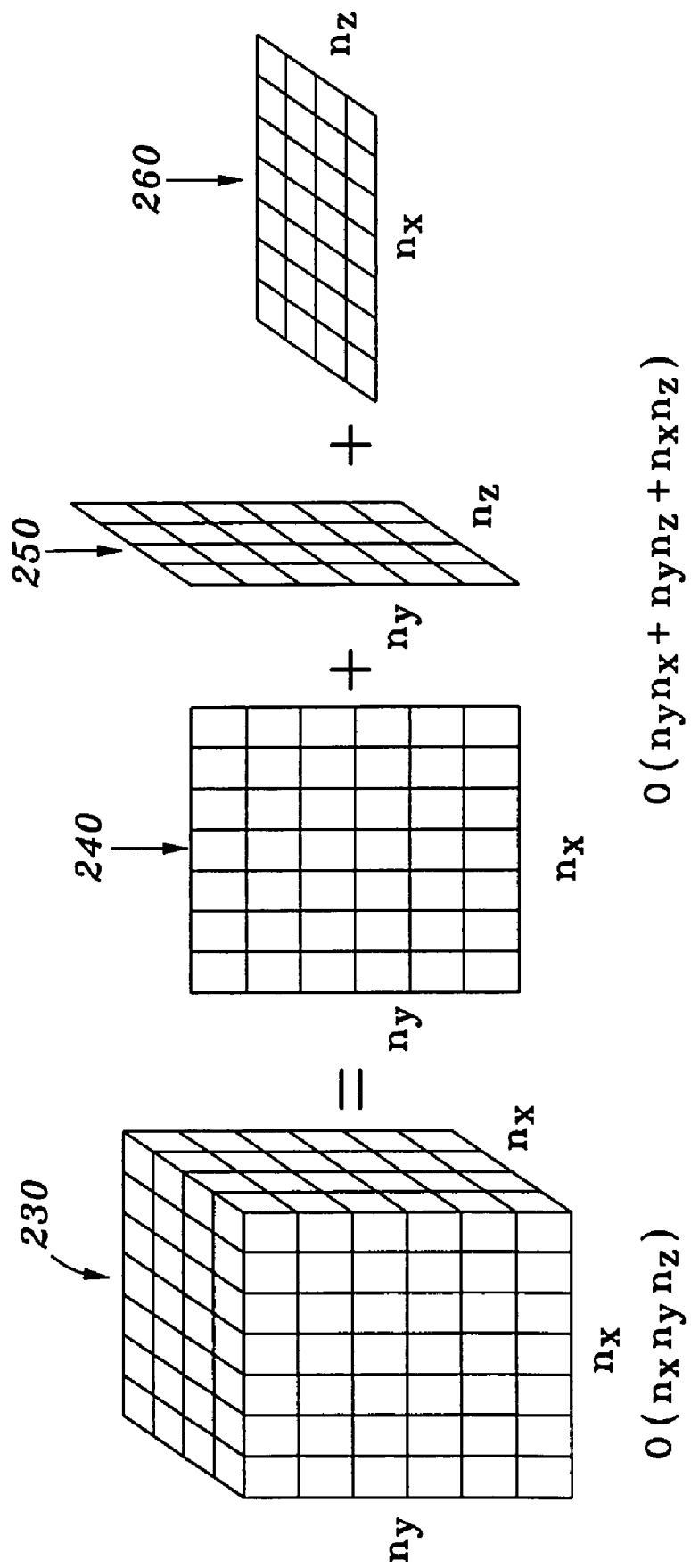
FIG. 7 is one embodiment of a representation of how the principles of the invention can be applied in a three dimensional application.

Up to this point, we have been discussing the hypothetical 2D shape 70. However, the principles of the invention are equally applicable to 3D shapes. For example, FIG. 7 illustrates the simplification, in terms of number of operations (i.e., O(N) means an algorithm takes N steps), of the computing problem for a 3D object. The cube 230 represents the 3D grid (with $n_x$ cells along the x-direction, $n_y$ cells along the y-direction, and $n_z$ cells along the z-direction) of the previous approaches whereby the number of steps is $n_x \times n_y \times n_z$. This is indicated by the notation of the figure, i.e. $O(n_x n_y n_z)$. The present method consists of breaking up this 3D grid cube into three 2D planes, which only require $O(n_x n_y + n_x n_z + n_y n_z)$ operations to complete. To illustrate why this is an improvement, consider the case where $n_x = n_y = n_z = 10$. The previously known explicit approaches would take 1000 operations, whereas the current approach takes only 300 operations [i.e., (10)(10)+(10)(10)+(10)(10)=100+100+100=300 operations].

Figure 8:
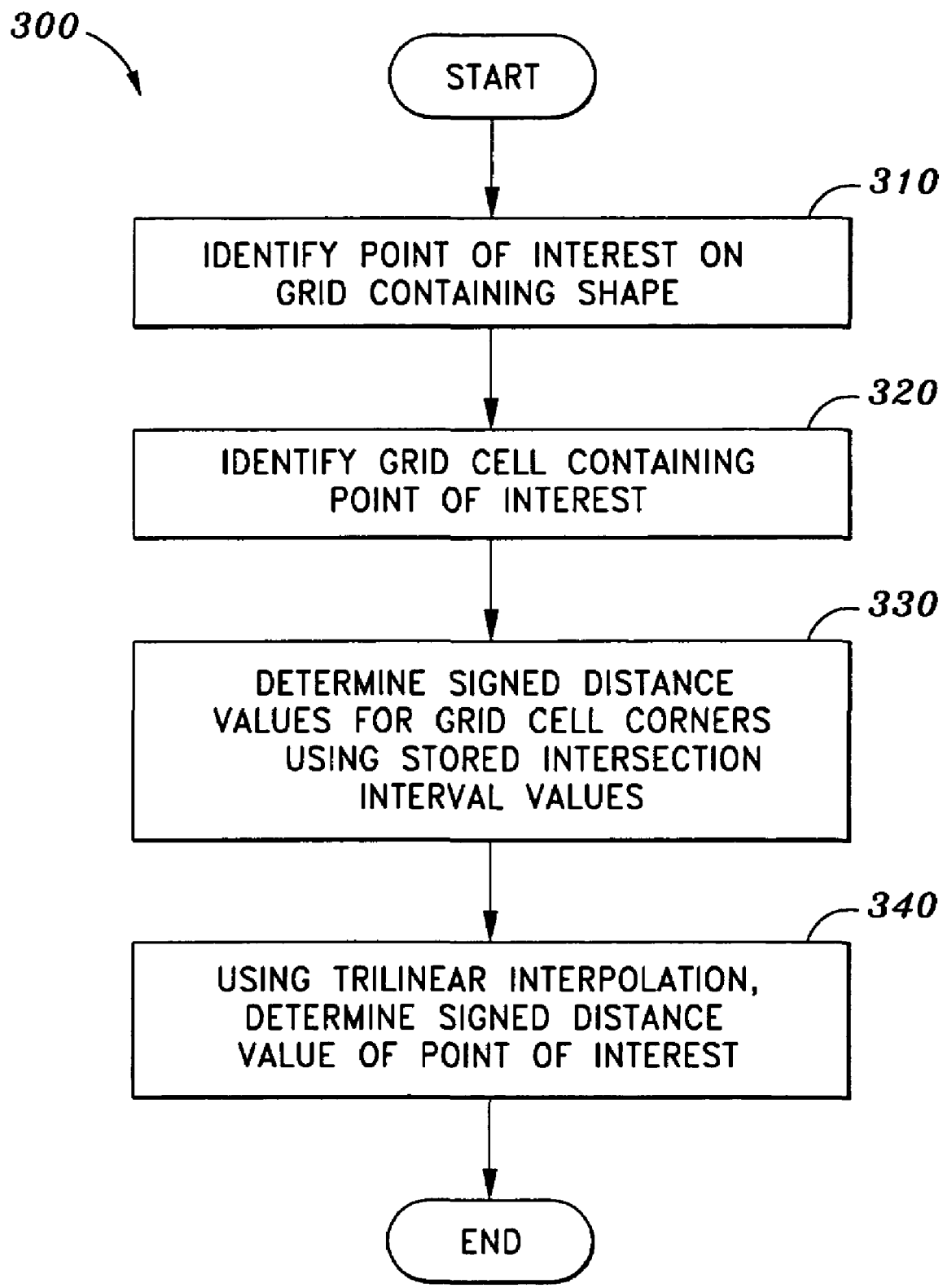
FIG. 8 is one embodiment of a flow diagram of how to determine the signed distance value of a point using the principles of the invention.

Referring now to FIG. 8, depicted is one embodiment of a process 300 for carrying out one or more aspects of the invention. In particular, process 300 begins at block 310 with the identification of a point in interest (e.g., previously described point 170) for which it is desirable to determine the signed distance function. The point of interest is a point on a grid containing a shape to be rendered. Once the point is identified, process 300 continues to block 320 where the actual grid cell containing the point is to be determined. In one embodiment, the grid cell containing the point is determined by identifying the two closest vertical lines and the two closest horizontal lines to the point in question. Since the point of interest has been identified, its coordinates would also be known. Thus, in one embodiment, the point's coordinates may be used to determined the two closest vertical lines and the two closest horizontal lines. The grid cell which is bounded by the two closest horizontal and two closest vertical lines is of course the grid cell which contains the point.

Continuing to refer to FIG. 8, once the grid cell is known process 300 continues to block 330 where the signed distance values for the grid cell corners may be determined. In one embodiment, this determination begins with the accessing of previously stored intersection intervals for two or more of the grid lines bounding the point of interest. As previously mentioned, in one embodiment only the entry and exit points to a given shape along a given grid line may be stored. In another embodiment, these intersection points are parameterized from 0 to 1. In still another embodiment, the stored intersection points (whether parameterized or not) which are closest to the grid cell corners are used to determine the signed distance values for the cell corners.

Once the signed distance values for the grid cell corners have been calculated, process 300 continues to block 340 where the signed distance value for the point of interest may be determined. In one embodiment, this is accomplished using the method of trilinear interpolation and the now-known signed distance values for the grid cell corners. As previously mentioned with reference to FIG. 6D, values at the grid cell corners may be combined, two by two, along the x-axis 40. The combined values along the x-axis 40 may then be used as inputs to compute the combined values along the y-axis 50. In the 3D case, the combined values along the y-axis 50 may be used as inputs to compute the combined values along the z-axis. The combined value along the z-axis may then, in turn, be taken as the desired final value at the point of interest.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of determining a signed distance value of a point comprising:
    storing a set of intersection intervals along each of a plurality of grid lines, wherein said grid lines comprise a plurality of grid cells, and wherein said grid cells comprise a grid containing a shape;
    using a processor (or computer) to perform the steps of:
    identifying a grid cell from said plurality of grid cells which contains said point;
    determining a signed distance value for each of a plurality of corners of said grid cell based on at least some of said sets of intersection intervals; and,
    determining said signed distance value for said point using said signed distance values for each of said plurality of corners.

2. The method of claim 1, wherein each of said sets of intersection intervals comprises an entry point and an exit point of said shape along each of said plurality of grid lines.

3. The method of claim 1, wherein said plurality of grid lines comprise both horizontal grid lines and vertical grid lines.

4. The method of claim 1, wherein said shape is one of a two dimensional shape and a three dimensional shape.

5. The method of claim 1, wherein identifying the grid cell comprises identifying the grid cell using a set of coordinates of said point.

6. The method of claim 1, wherein said plurality of corners of said grid cell comprises four corners.

7. The method of claim 1, wherein said determining the signed distance value for each of said plurality of corners comprises determining the signed distance value for each of the plurality of corners of said grid cell based on at least some of said sets of stored intersection intervals, wherein said at least some of the sets of stored intersection values is selected from the group consisting of two intersection values, three intersection values and four intersection values.

8. The method of claim 1, wherein determining the signed distance value for said point comprises determining the signed distance value for said point using trilinear interpolation based on said signed distance values for each of said plurality of corners.

9. The method of claim 1, further comprising parameterizing said sets of intersection intervals prior to said storing.

10. The method of claim 9, wherein said sets of intersection intervals comprise an entry point and an exit point of said shape along each of said plurality of grid lines, and wherein said parameterizing comprises parameterizing said sets of intersection intervals between 0 and 1.

11. The method of claim 1, wherein said shape and grid are three dimensional, and wherein the method further comprises:
    separating said three-dimensional grid into three two-dimensional planes; and
    storing said set of intersection intervals for each of the plurality of grid lines for each of said three two-dimensional planes.

12. A system comprising:
    a display device;
    a processor coupled to the display device; and
    a memory coupled to the processor, said memory to include instruction sequences to cause the processor to,
    store, in said memory, a set of intersection intervals along each of a plurality of grid lines, wherein said grid lines comprise a plurality of grid cells, and wherein said grid cells comprise a grid containing a shape,
    identify a grid cell from said plurality of grid cells which contains a point,
    determine a signed distance value for each of a plurality of corners of said grid cell based on at least some of said stored sets of intersection intervals, and
    determine a signed distance value for said point using said signed distance values for each of said plurality of corners.

13. The system of claim 12, wherein each of said sets of intersection intervals comprises an entry point and an exit point of said shape along each of said plurality of grid lines.

14. The system of claim 12, wherein said plurality of grid lines comprise both horizontal grid lines and vertical grid lines.

15. The system of claim 12, wherein said shape is one of a two dimensional shape and a three dimensional shape.

16. The system of claim 12, wherein said grid cell is identified using a set of coordinates for said point.

17. The system of claim 12, wherein said plurality of corners of said grid cell comprises four corners.

18. The system of claim 12, wherein said at least some of said sets of stored intersection values is selected from the group consisting of two intersection values, three intersection values and four intersection values.

19. The system of claim 12, wherein the signed distance value for said point is determined using trilinear interpolation based on said signed distance values for each of said plurality of corners.

20. The system of claim 12, wherein said memory further includes instruction sequences to cause said processor to parameterize said sets of intersection intervals prior to storing said sets of intersection intervals.

21. The system of claim 20, wherein each of said sets of intersection intervals comprises an entry point and an exit point of said shape along each of said plurality of grid lines, and wherein said sets of intersection intervals are parameterized between 0 and 1.

22. The system of claim 12, wherein said shape and grid are three dimensional, and wherein said memory further includes instruction sequences to cause the processor to,
    separate said three-dimensional grid into three two-dimensional planes; and
    store, in said memory, said sets of intersection intervals for each of the plurality of grid lines for each of said three two-dimensional planes.

23. A method of determining a signed distance value of a point comprising:
    parameterizing a plurality of entry points and exit points of a shape along each of a plurality of grid lines, wherein said grid lines comprise a plurality of grid cells, and wherein said grid cells comprise a two-dimensional grid containing a shape;
    storing said plurality of entry points and exit points;
    using a processor (or computer) to perform the steps of:
    identifying a grid cell from said plurality of grid cells which contains said point;
    determining signed distance values for each corner of said grid cell using said plurality of entry points and exit points; and
    determining said signed distance value for said point using said signed distance values for each corner of said grid cell.

24. The method of claim 23, wherein said plurality of entry points and exit points comprises a plurality of intersection intervals along each of said plurality of grid lines.

25. The method of claim 23, wherein said plurality of grid lines comprise both horizontal grid lines and vertical grid lines.

26. The method of claim 23, wherein said grid is three dimensional and said shape is three dimensional.

27. The method of claim 23, wherein identifying the grid cell comprises identifying the grid cell using a set of coordinates for said point.

28. The method of claim 23, wherein determining said signed distance value for said point comprises determining said signed distance value for said point using trilinear interpolation based on said signed distance values for said corners of said grid cell.

29. The method of claim 23, wherein parameterizing comprises parameterizing a plurality of entry points and exit points of a shape over a range of between 0 and 1.

30. The method of claim 23, wherein said shape and grid are three dimensional, and wherein the method further comprises:
    separating said three-dimensional grid into three two-dimensional planes; and
    storing said plurality of entry points and exit points of said shape for each of the plurality of grid lines for each of said three two-dimensional planes.

* * * * *